Oct. 26, 1937.   L. LEITZ   2,096,815
CAMERA
Filed Oct. 24, 1935
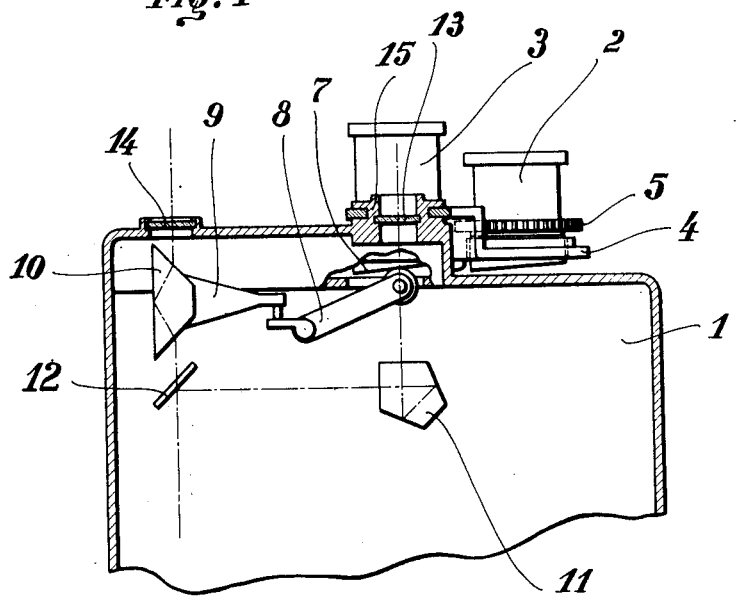
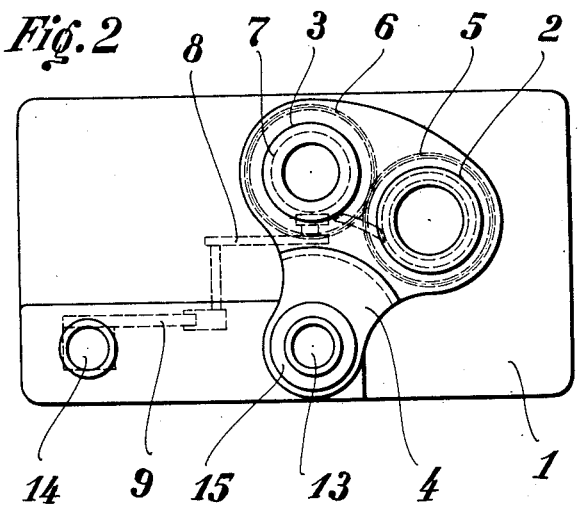
Ludwig Leitz
INVENTOR
BY Ivan E. A. Konigsberg
ATTORNEY Patented Oct. 26, 1937

2,096,815

UNITED STATES PATENT OFFICE 2,096,815

CAMERA

Ludwig Leitz, Wetzlar, Germany, assignor to Ernst Leitz, G. m. b. H., Wetzlar, Germany Application October 24, 1935, Serial No. 46,503
In Germany October 24, 1934

2 Claims. (Cl. 95—44)

This invention relates to photographic cameras of the type having a plurality of objectives mounted upon a rotatable or swingable carrier and in which the elements such as the view finder, the range finder and the exposure meter which serve to ascertain the correct focus, determine the field of view and length of exposure are built into the camera either singly or connected together. Cameras of this type may have the light admitting openings for the said elements located either outside the space covered by the objective carrier during the movements thereof or they may be located behind the carrier. In the latter case it is then necessary to provide the carrier with corresponding openings as will be understood. Such arrangements have proven practical when used with large cameras where space is not a factor. However, with small hand cameras such an arrangement cannot be used because the carrier would then project beyond the outside dimensions of the camera. On the other hand, if the carrier is so small as to correspond with the dimensions of the camera, then it is too small to include light admitting openings. It has been proposed to place these openings at either side of the axis around which the carrier rotates or swings and outside the space covered by the carrier during its operations. Again such an arrangement is impractical and objectionable because the swingable movements of the objective carrier will then interfere with the operations of the range finder and other focus ascertaining and determining elements and has therefore not been carried into practice. It has also been found that there is not sufficient space between the objectives and the axis of their carrier to accommodate light openings at this point.

The object of this invention is to provide a construction whereby the above named disadvantages are eliminated and which shall be particularly practical and advantageous when embodied in small hand cameras. The invention is embodied in a construction in which the light admitting opening is provided coaxial with the center around which the rotatable or swingable carrier is operated. This arrangement embodies the advantage that the opening is close to the objectives and thus very little parallax occurs and it offers no impediment to the operation of the carrier. Accordingly the invention is embodied in a camera arranged and constructed as hereinafter set forth and as illustrated in the drawing in which Fig. 1 is a sectional view of the camera embodying my invention with parts omitted, and Fig. 2 is a front elevation of the camera.

In the drawing the camera 1 is provided with two objectives 2 and 3 which are mounted upon a swingable carrier 4. The objectives are coupled together by gears 5 and 6. The inner ends 7 of the objectives are operatively connected to the arm 9 by means of the link 8. The dove prism 10 of the range finder is carried by the arm 9. 14 indicates a light admitting opening in front of the prism 10. The light admitting opening for the range finder is indicated at 13 within a sleeve 15 around which the carrier 4 is operated. 11 is a penta prism mounted in optical axial alinement with the opening 13. The light rays entering through the opening 13 are deflected by the prism 11 and join the light rays from the opening 14 in a mirror or like element 12. When an object is to be photographed one of the objectives is swung into photographing position and focused in the usual manner. The object will be in exact focus when the image coming through the opening 13 and into the prism 11 is projected and coincides with the image which is seen through the mirror 12. The field of view is determined by looking through the view finder system 12, 10 and 14. The operator ascertains that the object is correctly focused by observing the reflection of the image rays admitted through the opening 13 together with the image rays admitted through the opening 14 in the particular arrangement illustrated.

It will be noted that by placing the light admitting opening 13 coaxial with the carrier center a most compact and advantageous arrangement has been accomplished and the size of the carrier does not exceed the dimensions of the camera neither does the opening 13 interfere with the operations of the carrier.

I claim:—

1. In a photographic camera a range finder, a plurality of objectives, a hub member in the front wall of the camera, an objective carrier mounted to swing around and upon the said hub member to place any one of the objectives in photographing position and in operative relation to the range finder, said camera having a light admitting opening for the said range finder, said hub member having a second light admitting opening and optical means within the camera for joining the light rays admitted through the said two openings.

2. In a photographic camera a range finder, a plurality of objectives, an objective carrier mounted to operate around a given center to place any one objective in photographing position, means operatively connecting the range finder and the objective which has been placed in photographic position, said camera having a light admitting opening for the said range finder and having a second light admitting opening coaxial with the said given center and optical means for joining the light rays admitted through the said two openings.

LUDWIG LEITZ.